No. 870,657. PATENTED NOV. 12, 1907.
C. B. WOODWORTH.
TRACTION ATTACHMENT FOR VEHICLE TIRES.
APPLICATION FILED APR. 9, 1907.

2 SHEETS—SHEET 1.

WITNESSES:
Frank G. Parker
A. M. Tait

INVENTOR:
Charles B. Woodworth
By his Atty.
Henry Williams

No. 870,657. PATENTED NOV. 12, 1907.
C. B. WOODWORTH.
TRACTION ATTACHMENT FOR VEHICLE TIRES.
APPLICATION FILED APR. 9, 1907.

2 SHEETS—SHEET 2.

WITNESSES=
Frank G. Parker.
A. M. Tait.

INVENTOR
Charles B. Woodworth
By his Atty.

UNITED STATES PATENT OFFICE.

CHARLES B. WOODWORTH, OF NEWTON, MASSACHUSETTS.

TRACTION ATTACHMENT FOR VEHICLE-TIRES.

No. 870,657.

Specification of Letters Patent.

Patented Nov. 12, 1907.

Application filed April 9, 1907. Serial No. 367,272.

*To all whom it may concern:*

Be it known that I, CHARLES B. WOODWORTH, a subject of the King of Great Britain, residing in Newton, in the county of Middlesex and State of Massachusetts, have invented certain new and useful Improvements in Traction Attachments for Vehicle-Tires, of which the following is a specification.

This invention relates to removable traction-attachments especially applicable to rubber tires, the general object of such attachments being to prevent skidding or slipping.

My present invention or improvement has for its principal object to provide an anti-skidding device in which the sections are removable without necessitating the employment of tools, and can be returned into position or replaced by others, or by such removal render the device applicable to tires of different sizes.

Figure 1:
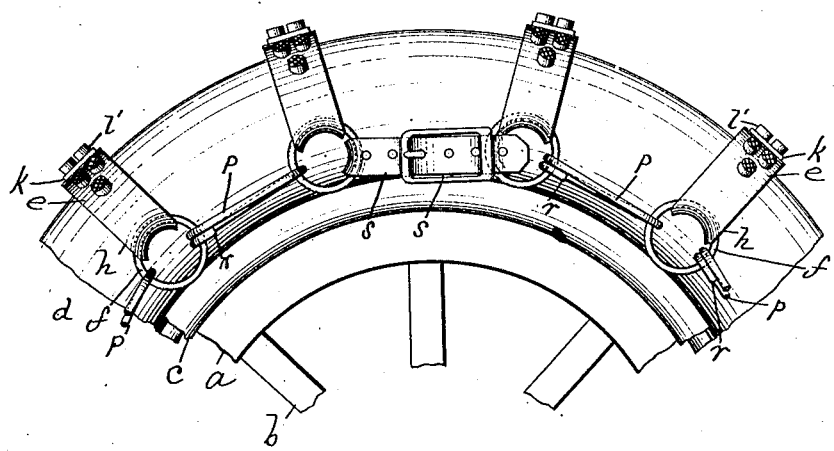
Figure 2:
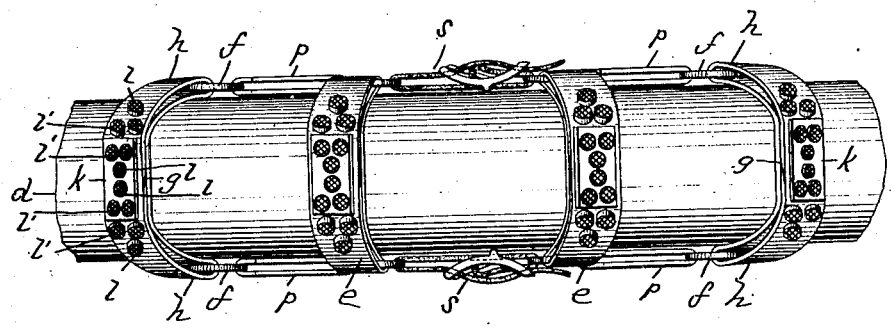
Figure 3:
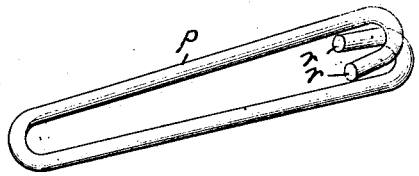
Figure 4:
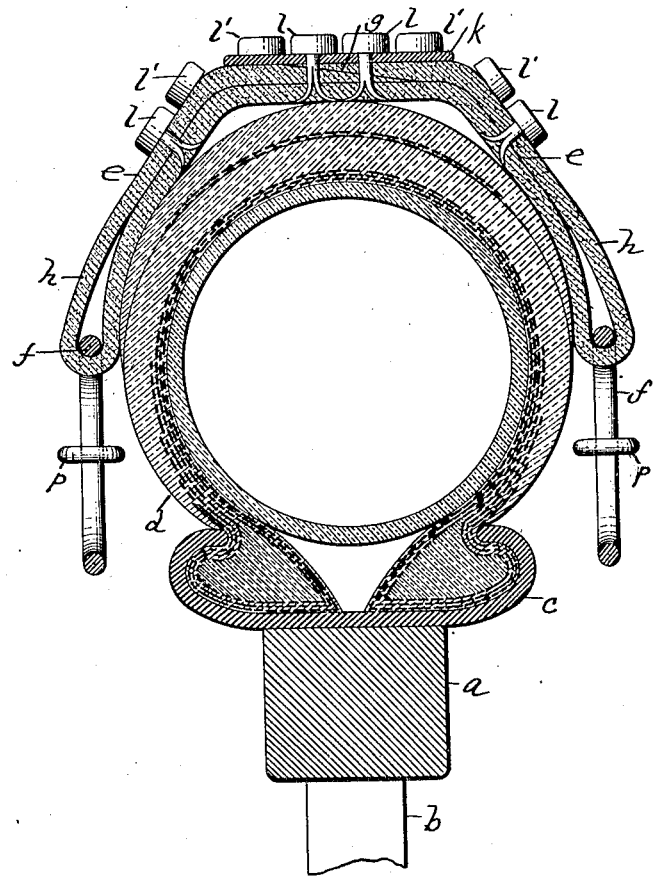
Figure 5:
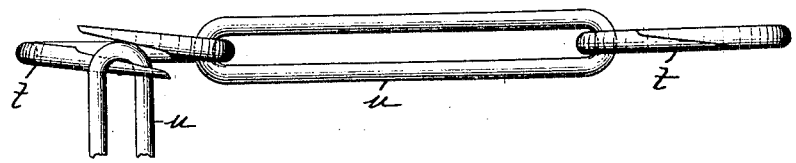

The nature of the invention is fully described in detail below, and illustrated in the accompanying drawings, in which:

Figure 1 is a side elevation of a traction-attachment embodying my invention, applied to a tire. Fig. 2 is a top or plan view of the same. Fig. 3 is an enlarged view of one of the connecting links removed. Fig. 4 is a cross section of my device applied to a tire. Fig. 5 represents a slight modification.

Similar letters of reference indicate corresponding parts.

$a$ represents a portion of the felly, $b$ a portion of the spokes, and $c$ a portion of the rim of a wheel provided with an ordinary rubber pneumatic tire $d$ such as is used in connection with automobiles.

The attachment comprises a number of sections arranged transversely on the tire at equal distances apart. Each section consists of the main portion or strap $e$ constructed of leather or other flexible and sufficiently durable material, rings or loops $f$ secured to opposite ends of said main portions or straps, and treads and rivets applied at the central or tread portion of the straps. Each strap is folded as illustrated, whereby its oppositely beveled ends $g$ overlap at the central or tread portion, which is, when the device is in position, on the periphery of the tire, thus providing loops $h$ next the opposite sides of the tire. The central or tread portion of each strap $e$ is flattened and in a straight line by the employment of a rigid, flat metallic plate or tread $k$ which is secured to the strap longitudinally (transversely with relation to the tire) by headed rivets $l$, said rivets not being new in this invention and extending through the plate and the two looped ends of the strap, securing said ends together—some of said rivets extending through the two folds of the strap on opposite sides of the rigid tread $k$. These rivets also constitute anti-friction contact surfaces or feet, and other rivets $l'$ may be employed which do not necessarily extend through both layers of the strap.

The rings $f$ are preferably metallic and circular, and are held by the loops $h$ on opposite sides of the tire, and said rings are connected together in two unbroken series on opposite sides of the tire by links $p$, preferably metallic, one end of each link being open and formed with inturned ends $r$ whereby it may be applied to and connect adjacent rings $f$.

In order that the device may be easily removed from the tire, two adjacent rings on each side are connected by a strap and buckle $s$ instead of by a metallic link.

It is evident that to apply or remove this device is a simple matter, as it requires merely the buckling or unbuckling of the straps $s$. Moreover it is comparatively easy to render the traction-attachment applicable to tires of greater or less diameter, as all that is necessary is to remove one or more sections by opening the ends of two or more of the links $p$, or to apply one or more sections by the employment of two or more extra links $p$. Thus all necessity for the employment of tools in removing or applying the device is obviated.

By means of the flat metallic treads $h$ and the headed rivets on said treads, the tread of the attachment is broadened, and instead of being in a narrow line is as broad as the distance between the rivets or feet $l'$ at the extreme outer ends of the plates $k$. This of course increases the amount of traction and aids largely in preventing skidding or slipping. Moreover it enables the treads and rivets to wear evenly as otherwise the flexible strap would conform to the curvature of the tire, and the greatest wear would come on the central rivets or points of contact.

In the modification illustrated in Fig. 5, I provide instead of the whole or unbroken rings $p$ split rings $t$, and the links which connect the split rings may be whole as indicated at $u$.

It will readily be seen that by properly tightening the buckles $s$ the sections are held firmly in position on the tire without necessity for any straps or other connections extending under the rim.

Having thus fully described my invention, what I claim, and desire to secure by Letters Patent, is:

1. In a detachable traction-attachment for vehicle-tires, a series of sections adapted to extend across the periphery or tread portion of the tire and each consisting of a folded flexible strap with its ends secured together whereby loops are formed at the ends of the section on opposite sides of the tire, rings secured in said loops, and detachable links intermediate of and connecting said rings, for the purpose set forth.

2. In a detachable traction-attachment for vehicle-tires, a series of sections adapted to extend across the periphery or tread portion of the tire and each consisting of a folded flexible strap with its ends secured together whereby loops are formed at the ends of the section on opposite sides of the tire, rings secured in said loops, a series of links connecting the rings on opposite sides of the tire, and means for connecting and drawing toward each other the opposite ends of the series of loops and rings on each side of the tire, whereby the sections are held in position on the tire without being secured together under the rim.

In testimony whereof I have signed my name to this specification in the presence of two subscribing witnesses.

CHARLES B. WOODWORTH.

Witnesses:
HENRY W. WILLIAMS,
M. A. ATWOOD.